United States Patent [19]
Balukin

[11] Patent Number: 5,358,315
[45] Date of Patent: Oct. 25, 1994

[54] MICROPROCESSOR-BASED ELECTROPNEUMATIC LOCOMOTIVE BRAKE CONTROL SYSTEM HAVING PNEUMATIC BACKUP BRAKE CONTROL

[75] Inventor: Richard F. Balukin, Pittsburgh, Pa.

[73] Assignee: Westinghouse Air Brake Company, Wilmerding, Pa.

[21] Appl. No.: 41,094

[22] Filed: Apr. 1, 1993

[51] Int. Cl.⁵ .............................................. B60T 15/14
[52] U.S. Cl. ......................................... 303/15; 303/16; 303/37
[58] Field of Search ............... 303/15, 20, 61, DIG. 3, 303/3, 7, 36, 37, 38, 39, 83, 77, 69, 16

[56] References Cited

U.S. PATENT DOCUMENTS

| | | | |
|---|---|---|---|
| 2,926,965 | 3/1960 | Wilson et al. | 303/38 X |
| 3,583,771 | 6/1971 | Dressler, Jr. | 303/15 X |
| 4,043,605 | 8/1977 | Hart | 303/37 |
| 4,125,294 | 11/1978 | Cannon | 303/37 |
| 4,226,482 | 10/1980 | Stäble | 303/37 X |
| 4,536,040 | 8/1985 | Eder | 303/37 |
| 4,848,849 | 7/1989 | Epp et al. | 303/37 X |
| 5,192,118 | 3/1993 | Balukin et al. | 303/15 |

Primary Examiner—Robert J. Oberleitner
Assistant Examiner—Peter M. Poon
Attorney, Agent, or Firm—Gary J. Falce

[57] ABSTRACT

A microprocessor-based, electropneumatic brake control system for a locomotive having a pneumatic backup control valve which includes a quick release valve for maintaining a release condition of the control valve during dynamic braking. An arrangement is provided to prevent the control valve from applying during a trainline-initiated emergency application prior to the dynamic brake becoming ineffective following dynamic brake knockout, in order to avoid the possibility of a wheel skid.

4 Claims, 1 Drawing Sheet

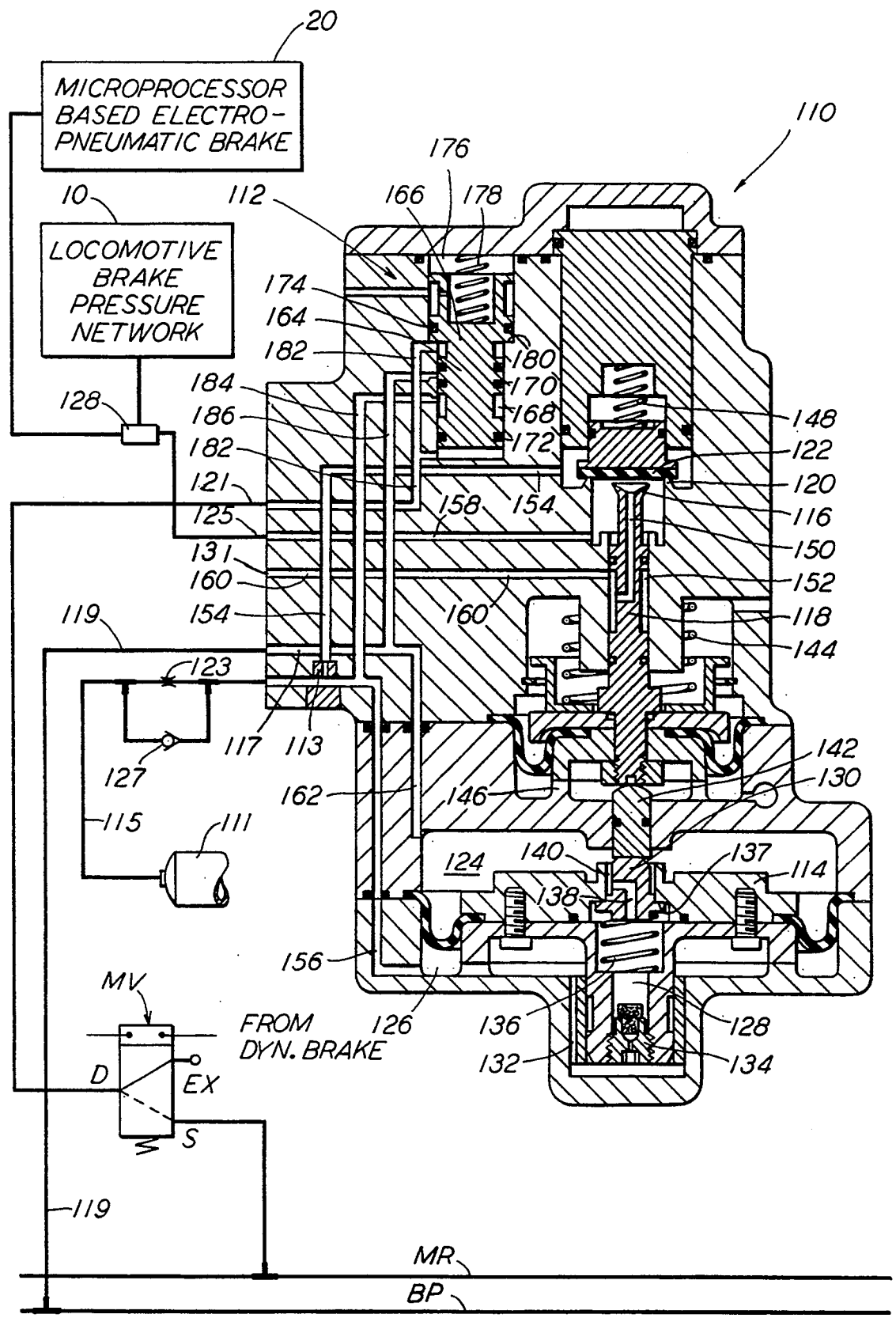

MICROPROCESSOR-BASED ELECTROPNEUMATIC LOCOMOTIVE BRAKE CONTROL SYSTEM HAVING PNEUMATIC BACKUP BRAKE CONTROL

BACKGROUND OF THE INVENTION

The present invention relates to microprocessor based electro-pneumatic type locomotive brake control systems and particularly to a pneumatic backup brake control circuit for such a locomotive brake control system.

Modern-day locomotive controls, including the locomotive brake control system, incorporate computer technology to reduce hardware and to facilitate adaptation of the system to various customer requirements.

In one such brake control system, disclosed in U.S. Pat. No. 5,192,118, issued Mar. 9, 1993, and incorporated herein by reference, a cab-mounted, handle-operated, brake controller outputs a desired brake command signal to a microprocessor unit, which interprets this brake command signal in terms of a feedback signal indicative of the pressure of air in an equalizing reservoir, and then effects operation of application and release electro-magnetic valves to adjust the equalizing reservoir pressure in accordance with the brake command signal.

A high-capacity pneumatic relay valve device is employed to vary the trainline brake pipe pressure in accordance with variations of the equalizing reservoir pressure, in order to control the railway car brakes. This so-called brake pipe control circuit of the aforementioned brake control system is shown and described in U.S. Pat. No. 4,904,027.

The brake control system further includes a locomotive brake cylinder control circuit having electropneumatic application and release valves. These electro-pneumatic valves are operated by the microprocessor in response to changes in brake pipe pressure initiated by the brake pipe control circuit in accordance with movement of an automatic brake handle of the cab brake controller. Another high-capacity pneumatic relay valve device regulates the pressure in the locomotive brake cylinders according to the pressure output of the locomotive brake cylinder control circuit application and release electropneumatic valves.

The electropneumatic valves in the brake pipe control circuit and in the locomotive brake cylinder control circuit are arranged to assume a pressure release state, in the event of a power loss at the microprocessor unit. In consequence of such a power loss, therefore, brake pipe pressure is reduced while, concurrently, the locomotive brake cylinder pressure is released. A pneumatic back-up control valve is provided to establish locomotive brake cylinder pressure in response to the afore-mentioned reduction of brake pipe pressure resulting from such fail-safe operation of the electro-pneumatic valves in the brake pipe control circuit, there being a double check valve to separate the pneumatic backup control valve from the electro-pneumatic valves in the locomotive brake cylinder control circuit.

The pneumatic backup control valve includes a piston valve assembly subject on opposite sides to compressed air in the brake pipe and in a supply reservoir. When brake pipe pressure is reduced, the resultant pressure differential forces the piston valve assembly to application position, wherein the supply reservoir air supplies the brake cylinder pilot line to establish the locomotive brake pressure until a force balance is restored across the piston valve assembly. In this manner, the piston valve assembly seeks a lap position in which the supply of brake cylinder pressure is terminated at a value corresponding to the brake pipe pressure reduction in effect.

This locomotive brake cylinder pressure may be released independently of the car brakes by means of a quick release valve associated with the pneumatic backup control valve. A pressure signal supplied to the quick release valve, when a quick release switch is actuated, initiates this "bail-off" or quick release function. The brake pipe supply reservoir pressures are communicated via the quick release valve to establish pressure equalization across the piston valve assembly, when the quick release switch is actuated. In this manner, the supply reservoir pressure is effectively equalized with the reduced brake pipe pressure, such that spring force acting on the piston valve assembly is effective to force the piston valve assembly to release position and the locomotive brake cylinder pressure is exhausted.

In a similar manner, a dynamic brake interlock magnet valve is employed to actuate the quick release valve and accordingly maintain the locomotive brake cylinder pressure exhausted so long as the dynamic brake effectiveness is sufficient to hold in the magnet valve. The purpose of this is to prevent excessive brake forces and accordingly a wheel slide condition from occurring. Such an arrangement has proven to work reliably under most conditions. Where high operating pressures are required, however, a relatively large supply reservoir is employed, the volume of this reservoir being capable of maintaining a pressure head on the supply reservoir side of the backup control valve piston valve assembly, even when brake pipe pressure on the opposite side is released at an emergency rate. It will be appreciated therefore that prior to the dynamic brake being knocked out in response to a train line-initiated emergency application, for example, the supply reservoir pressure is unable to decrease at the same rate as the brake pipe pressure and a pressure differential is created across the piston valve assembly in a brake application direction. An application of the locomotive air brakes through the pneumatic backup valve can thus occur while the dynamic brake is still effective to create the above-mentioned undesirable wheel slide condition. It will be understood that while interlock circuits are provided to knock out the dynamic brakes under such prevailing train line-initiated emergency conditions, typically there is an inherent delay in this action taking effect, during which time, although relatively brief, the above-discussed condition can arise.

SUMMARY OF THE INVENTION

It is, therefore, the object of the present invention to provide a simple, yet reliable way of preventing a pneumatic, back-up control valve device, such as the type employed in the referencing patent, from applying in response to a train line-initiated emergency when the locomotive dynamic brake is still effective following dynamic brake knockout.

It is a further object of the invention to achieve the foregoing without significantly compromising the charging and application functions of the afore-mentioned control valve device.

Briefly, these objectives are carried out by the provision of a choke in the flow passage between a supply reservoir and the reference chamber on one side of the back-up control valve control piston, the other side of which is subject to brake pipe pressure in a control chamber. During dynamic braking, a quick release valve of the back-up control valve interconnects the control and reference chambers to establish pressure equalization across the control piston, so that during an emergency reduction of brake pipe pressure in response to a trainline initiated emergency application, the control piston is prevented from moving to its application position by a return spring. The choke in the flow passage prevents the supply reservoir from maintaining a pressure in the reference chamber sufficient to create an application pressure differential across the control piston.

These and other objects, features, and advantages of the invention will become apparent from the following more detailed explanation when taken in conjunction with the accompanying single FIGURE drawing showing a section view of the back-up control valve connected schematically in a brake system with which the invention is employed.

DESCRIPTION AND OPERATION

Referring to the single FIGURE drawing, a pneumatic backup brake control valve 110 is shown comprising a quick release valve 112, and a piston valve assembly having a diaphragm type control piston 114, an exhaust valve seat 116 at one end of a piston stem 118, a supply valve seat 120 formed on the valve body in surrounding relationship with exhaust valve seat 116, and a valve element 122 with which the supply valve and exhaust valve seats are engageable.

Control piston 114 cooperates with the valve body to form a control chamber 124 on one side and a reference chamber 126 on the opposite side. Carried in a central cavity 128 of piston 114, so as to have limited axial movement relative thereto, is a charging and dissipation valve 130. An extension 132 of piston 114 projects into chamber 126 and is provided with a charging and dissipation choke 134. A relatively light spring 136 biases charging and dissipation valve 130 against a stop shoulder 137 in its uppermost position, as viewed in the drawing, while a central passage 138 and an annular groove 140 in charging and dissipation valve 130 establish communication between cavity 128 and control chamber 124.

A pusher pin 142 is carried in the valve body, one end being engageable with charging and dissipation valve 130 and the other end with the end of piston stem 118 opposite exhaust valve seat 116. Another spring 144 that is stronger than spring 136 biases stem 118 in a downward direction toward engagement with a stop 146. In this release and charging position, as shown in the drawing, exhaust valve seat 116 is displaced from valve element 122, which is forced by a light spring 148 into engagement with supply valve seat 120. A central passage 150 in stem 118 is connected between an annular groove 152 in stem 118 and the end of stem 118 having exhaust valve seat 116. A passage 154 connects the area surrounding supply valve seat 120 with a relatively large supply reservoir 111 via an application choke 113 and a pipe 115; and a branch 156 of passage 154 is connected to reference chamber 126. Provided in pipe 115 is a control choke 123 and a one-way check valve 127 in parallel with choke 123. Another passage 158 connects the area within the bounds of supply valve seat 120 with the locomotive brake pressure network via a pipe 125 and double check valve 128; a passage 160 connects the annular groove 152 to exhaust port 131; and a passage 162 connects chamber 124 to the trainline brake pipe via a control passage 117 and a brake pipe branch pipe 119. The relatively large size of reservoir 111 is dictated by the fact that control valve device 110 operates on the pressure equalization principle wherein emergency brake pressure is provided by equalization of this reservoir pressure with the locomotive brake cylinder volume, and plays an important part in the desideratum of the present invention.

Quick release pilot valve 112 is comprised of a spool valve member 164 having a head portion 166 of spool valve member 164 forming a piston. Formed in spool valve member 164 is an annular groove 168 on the opposite sides of which are disposed O-ring seals 170, 172. Another O-ring seal 174 separates the underside of head portion 166 from a vented chamber 176 on the opposite side in which a bias spring 178 is disposed to urge the piston and spool member toward engagement with a stop shoulder 180 formed on the control valve body, in a deactuated position of the quick release valve.

A passage 182 connects the underside of spool member 164 and head portion 166 to the delivery port D of a 3-way, 2-position, spring-returned dynamic brake interlock magnet valve MV via a quick release control pipe 121. In the energized condition of magnet valve MV, delivery port D is connected to a supply port S to which main reservoir pressure is connected via a branch of the trainline main reservoir pipe MR. In the de-energized condition, the main reservoir supply port S is cut off and an exhaust port EX is connected to the magnet valve delivery port D. A branch passage 184 is connected between passage 156 and spool member 164, such as to remain in communication with spool groove 168 in both the actuated and deactuated positions of quick release valve 112, and a branch passage 186 is connected between passage 162 and spool member 164 at a location axially spaced from spool groove 168 such a distance as to be uncovered by the spool groove in the deactuated position of the quick release valve.

During charging of the locomotive microprocessor based electropneumatic brake equipment, brake pipe pressure carried in the train brake pipe BP is concurrently supplied via pipe 119 and passage 117 of pneumatic backup control valve 110 to control chamber 124 thereof. As the brake pipe pressure increases, piston 114 is forced to its downward-most position, as shown, in which spring 136 is effective to force charging and dissipation valve 130 into engagement with stop shoulder 137. In this position, charging and dissipation valve 130 opens a charging port via annular groove 140 and central passage 138 through which reference chamber 126 and supply reservoir 111 are charged to the pressure in brake pipe BP and control chamber 124. During this charging of supply reservoir 111, unrestricted flow of air is conducted via check valve 127 in bypass of choke 123 to assure prompt charging of the reservoir. In this downward-most position of piston 114, spring 144 is effective to force stem 118 into engagement with its stop 146, thereby causing exhaust valve seat 116 to pull away from valve element 122, which is in turn forced by its spring 148 to engage the supply valve seat 120. The locomotive brake pressure network 10, which consists basically of a high capacity relay valve and brake cylinder device, is thus vented via double check valve 128, pipe 125, passage 158, the open exhaust valve, central passage 150, annular groove 152 in stem 118, passage 160 and exhaust port 131.

During this charging of the locomotive brake equipment including backup pneumatic control valve device 110, dynamic brake interlock magnet valve MV is in a de-energized condition in which delivery passage D is connected to atmosphere via port EX. Actuating pressure is thus vented from quick release valve 112 via passage 182, pipe 121, and the magnet valve exhaust port EX. In the absence of actuating pressure at quick release valve 112, spring 178 is effective to hold spool member 164 in its downward-most position, as shown, in which passages 184 and 186 are cut off to isolate control chamber 124 on one side of control piston 114 from reference chamber 126 on the opposite side. Control chamber 124 and reference chamber 126 are, however, communicated via charging and dissipation valve 130, as explained.

Pneumatic control valve device 110 provides a backup pneumatic automatic locomotive brake, operating in response to variations in brake pipe pressure in parallel with the automatic brake control circuit of the locomotive microprocessor-based electropneumatic brake 20, explained in the "referencing" patent incorporated herein. A reduction of brake pipe pressure, as explained relative to applying the car brakes throughout the train, is reflected at control chamber 124 of control valve 110. Due to charging choke 134, the pressure in reference chamber 126 is prevented from following the pressure drop in chamber 124, so that a pressure differential is established therebetween. The resultant initial upward movement of piston 114 causes charging and dissipation valve 130 to interrupt the pressure communication between chambers 124 and 126, thereby encouraging positive upward movement of piston 114 to application position. Exhaust valve seat 116 engages valve element 122 and displaces the valve element from supply valve seat 120 in response to movement of piston 114 and thus stem 118 to application position. Supply reservoir 111 pressure is thus connected to the locomotive brake pressure network 10 via pipe 115, chokes 123 and 113 in series, control valve passage 154, the open supply valve, delivery passage 158, and pipe 125. Due to the delay imposed by chokes 113 and 123, the pressure under control of the microprocessor-based electropneumatic brake 20 is effective through double check valve 128 to hold the pneumatic back-up control valve brake pressure in abeyance pending failure of the microprocessor-based electropneumatic brake.

When the supply reservoir pressure effective in reference chamber 126 is reduced substantially to the pressure in control chamber 124, spring 144 forces stem 118 and piston 114 in a downward direction until valve element 122 engages supply valve seat 120 to terminate further buildup of brake pressure. Control piston 114 is stabilized in this lap position in which brake cylinder delivery passage is also cut off from exhaust passage 160 by continued engagement of exhaust valve seat 116 with valve element 122, so that brake pressure at the locomotive brake pressure network 10 is neither increased nor decreased.

It will now be appreciated that in the event the microprocessor-based electropneumatic brake becomes inoperative due to a loss of power, for example, the pressure supplied to the locomotive brake pressure network 10 will be automatically switched through double check valve 128 from the malfunctioning microprocessor-based control to the impending pneumatic backup control provided by control valve device 110.

It will be further appreciated that in the case of a train line initiated emergency brake application, such as the occurrence of a break-in-two, during such time as the dynamic brake is operative, it is the purpose of the present invention to prevent the pneumatic backup control valve 110 from supplying brake pressure to the locomotive brake pressure network, in response to the emergency reduction of brake pipe pressure in consequence of such break-in-two.

During such time as the locomotive dynamic brake is effective, magnet valve MV is in an energized condition in which its supply port S is connected to the delivery port D. Main reservoir air is thus connected from the trainline main reservoir pipe to passage 182 of pneumatic backup valve 110 via magnet valve MV, and pipe 121. The underside of the quick release valve spool 164 and piston head 166 are accordingly pressurized to actuate quick release valve 112 to its application position in opposition to spring 178. In this application position, O-ring 170 is shifted to the side of passage 186 opposite the side shown, so that passages 184 and 186 are interconnected by spool groove 168. Consequently, reference chamber 126 is placed in communication with control chamber 124 via interconnected passages 184, 186 to allow pressure equalization therebetween. This destroys the pressure differential across control piston 114, whereby spring 144 becomes effective to force stem 118 further downward from a lap position, in which the piston valve assembly is assumed to be, to a release position in which the lower end of stem 118 is engaged with stop 146. In this release position, the upper end of stem 118 having exhaust valve seat 116 is pulled away from valve element 122, which remains engaged with supply valve seat 120. Accordingly, the brake pressure in pipe 125 is vented to atmosphere via passage 158, the open exhaust valve, central passage 150 in stem 118, passage 160, and exhaust port 131. Having vented pipe 125, the locomotive brake pressure network is accordingly driven to a release condition in which the locomotive air brakes are released.

In the event of a trainline initiated emergency brake application during such time as the dynamic brake is effective, as in the case of a train break-in-two, the open brake pipe causes a rapid reduction of pressure in the brake pipe, causing the pressure in control chamber 124 to also reduce at an emergency rate via passage 162 and 117, branch pipe 119, and the open brake pipe. Since reference chamber 126 is interconnected with control chamber 124 via quick release valve 112, the pressure in this chamber follows the reduction of brake pipe pressure such that no substantial pressure differential is able to develop across control piston 114. This is only possible because of the presence of choke 123 in pipe 115, which prevents pressure in the relatively large supply reservoir 111 from feeding sufficient air to chamber 126 to support the pressure therein.

It will be appreciated that, in the absence of any significant pressure differential being developed across piston 114, in accordance with the foregoing, spring 144 will continue to support the piston valve assembly in its release position, as shown, thereby assuring that the locomotive brake pressure network does not effect an undesired application of the locomotive air brakes for the duration that the dynamic brake is sufficiently effective to hold magnet valve MV in its energized condition, thereby preventing the possibility of a wheel slide arising due to excessive braking.

When the emergency reduction of brake pipe pressure is sensed by ancillary air brake control components in the usual, well-known manner, the dynamic brake is "knocked out", allowing magnet valve MV to return to its de-energized condition in which delivery port D is cut off from supply port S and connected to exhaust port EX. This vents the actuating pressure under spool member 164 and piston head 166 of quick release valve 112 via passage 182, pipe 121, and magnet valve MV, to thereby allow spring 178 to reset the quick service valve to its de-actuated position shown. In this position, passages 184 and 186 are cut off from each other to interrupt fluid pressure communication between control chamber 124 and reference chamber 126. The air remaining in supply reservoir 111, which remains at a relatively high pressure due to its large volume and the pressure restriction provided by choke 123, is now equalized with the reduced pressure in reference chamber 126 to re-establish a pressure differential across control piston 114 sufficient to overcome the force of spring 144 and accordingly force the piston valve assembly to its application position. As previously explained, this closes the exhaust valve and opens the supply valve to admit pressure from supply reservoir 111 to the locomotive brake pressure network 10 via pipe 115, choke 123, choke 113, passage 154, the open supply valve, passage 158, pipe 125, and double check valve 128. In that brake pipe pressure effective in control chamber 124 is depleted during such break-in-two emergency, no lap condition of control valve 110 occurs, as during service braking, and accordingly the control valve piston assembly remains in application position, whereby maximum brake pressure is realized dependent upon the pressure existing in supply reservoir 111 at the time the dynamic brake interlock magnet valve MV is de-energized.

The one-way check valve 127 provided in pipe 115 in parallel with choke 123 assures unrestricted charging of supply reservoir 111 in bypass of choke 123 so that no undue delay in charging is encountered due to choke 123.

Further, the size of application choke 113, with which choke 123 is in series in the application flow path, must be selected in accordance with the size of choke 123, to obtain proper application flow rates.

Having now described the instant invention and its operation, it will be understood that the pneumatic backup control valve device 110 is disabled during the time the dynamic brake is effective, so that in the event of a trainline initiated emergency application, the locomotive air brakes are withheld until such time as the locomotive ancillary control valves interrupt power to the dynamic brake controls in consequence of such trainline initiated emergency. In this manner, positive action is taken to prevent the back-up control valve 110 controlled locomotive emergency air brake from being concurrently applied with the dynamic brake, thereby preventing a potential wheel slide condition from existing.

I claim:

1. A locomotive brake control system having an air brake and a dynamic brake, said air brake including a brake pipe charged to a certain chosen pressure to provide a source of compressed air, a supply reservoir charged to the pressure carried in said brake pipe, brake means, and a control valve device via which pressurization of said brake means is controlled comprising:
   (a) said control valve device having:
      (i) a control chamber to which said brake pipe is connected;
      (ii) a reference chamber to which said supply reservoir is connected via a first flow path;
      (iii) a control piston interposed between said control and reference chambers so as to be subject on the respective opposite sides thereof to said brake pipe fluid pressure and said supply reservoir fluid pressure;
      (iv) said control piston being movable from a release position to an application position in response to a reduction of said brake pipe fluid pressure creating a predetermined fluid pressure differential between said control chamber and said reference chamber;
      (v) valve means operable in response to movement of said control piston to said application position for establishing fluid pressure communication between said supply reservoir and said brake means via a second flow path having fluid pressure communication with said first flow path, whereby a reduction of fluid pressure occurs in said reference chamber until such time as the fluid pressure differential across said control piston is less than said predetermined differential;
   (b) quick release means operative in response to operation of said dynamic brake for interconnecting said control chamber and said reference chamber; and
   (c) means for restricting the flow of fluid under pressure from said supply reservoir to said reference chamber via said first flow path comprising;
      (i) a common flow path via which said first and second flow paths are interconnected with said supply reservoir; and
      (ii) a first choke in said common flow path.

2. A locomotive brake control system as recited in claim 1, wherein said means for restricting the flow of fluid under pressure further comprises a one-way check valve connected in said flow path in parallel with said first choke.

3. A locomotive brake control system as recited in claim 1, further comprising a second choke in said second flow path, said first and second chokes controlling said fluid pressure communication between said supply reservoir and said brake means in series.

4. A locomotive brake control system as recited in claim 3, further comprising:
   (a) a third flow path interconnecting said control chamber and said reference chamber;
   (b) said quick release valve means including a spool valve interposed in said third flow path; and
   (c) said dynamic brake comprising a magnet valve device operative in accordance with the effectiveness of said dynamic brake to cause said spool valve device to establish and interrupt fluid pressure communication via said third flow path.

* * * * *